(12) United States Patent
Goren et al.

(10) Patent No.: US 12,326,784 B1
(45) Date of Patent: Jun. 10, 2025

(54) MANAGING IDENTIFIERS OF EXPOSED FILESYSTEM ENTITIES

(71) Applicant: VAST DATA LTD., Tel Aviv (IL)

(72) Inventors: Avi Goren, Tel Aviv (IL); Uri Weissbrem, Tel Aviv (IL); Oded Sonin, Tel Aviv (IL); Ohad Ben-Yehuda, Tel Aviv (IL)

( * ) Notice: Subject to any disclaimer, the term of this patent is extended or adjusted under 35 U.S.C. 154(b) by 91 days.

(21) Appl. No.: 18/355,394

(22) Filed: Jul. 19, 2023

(51) Int. Cl.
*G06F 11/00* (2006.01)
*G06F 11/14* (2006.01)
*G06F 16/13* (2019.01)
*G06F 16/182* (2019.01)

(52) U.S. Cl.
CPC ......... *G06F 11/1423* (2013.01); *G06F 16/13* (2019.01); *G06F 16/1844* (2019.01)

(58) Field of Classification Search
CPC ... G06F 11/1423; G06F 16/1844; G06F 16/13
See application file for complete search history.

(56) References Cited

U.S. PATENT DOCUMENTS 9,632,892 B1* 4/2017 Sledz .................. G06F 11/1443

* cited by examiner

*Primary Examiner* — Jason B Bryan

(57) ABSTRACT

A method for responding to an access request from a user, the method includes (a) receiving, by a target storage system (TSS) and from a user an access request to access an exposed file system entity (EFSE), the access request is associated with an EFSE external identifier (EEID); (b) applying a logically reversible function on the EEID and on a replication stream identifier (RSID) to provide a TSS internal EFSE identifier (TID); wherein the EFSE was sent to the TSS in association with a replication stream that is identified by the RSID; (c) accessing the EFSE using the TID; and (d) wherein the TID uniquely identifies the EFSE within the TSS.

15 Claims, 5 Drawing Sheets

300

MANAGING IDENTIFIERS OF EXPOSED FILESYSTEM ENTITIES

BACKGROUND

A mount-point represents a filesystem directory that is associated with a drive path at another computer, so as to expose the directory to the other computer that uses the filesystem. The mount point is created upon a mounting operation for exposing a filesystem entity (e.g., a file or directory). In response to the mounting, the client application receives a unique identifier for identifying the exposed file or directory upon subsequent accesses to the exposed file or directory.

When the filesystem entity is being part of a replication process from a source storage system to a destination storage system and the destination storage system takes over upon a failover that follows a failure of the source storage system, the client that accesses files or directories under the mount-point, will experience the disconnection due to the loss of the mount point, and will need to remount the replica of the file or directory on the destination storage system, causing a disruption to the ongoing access flows.

SUMMARY

There may be provided a method managing identifiers of exposed filesystem entities.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
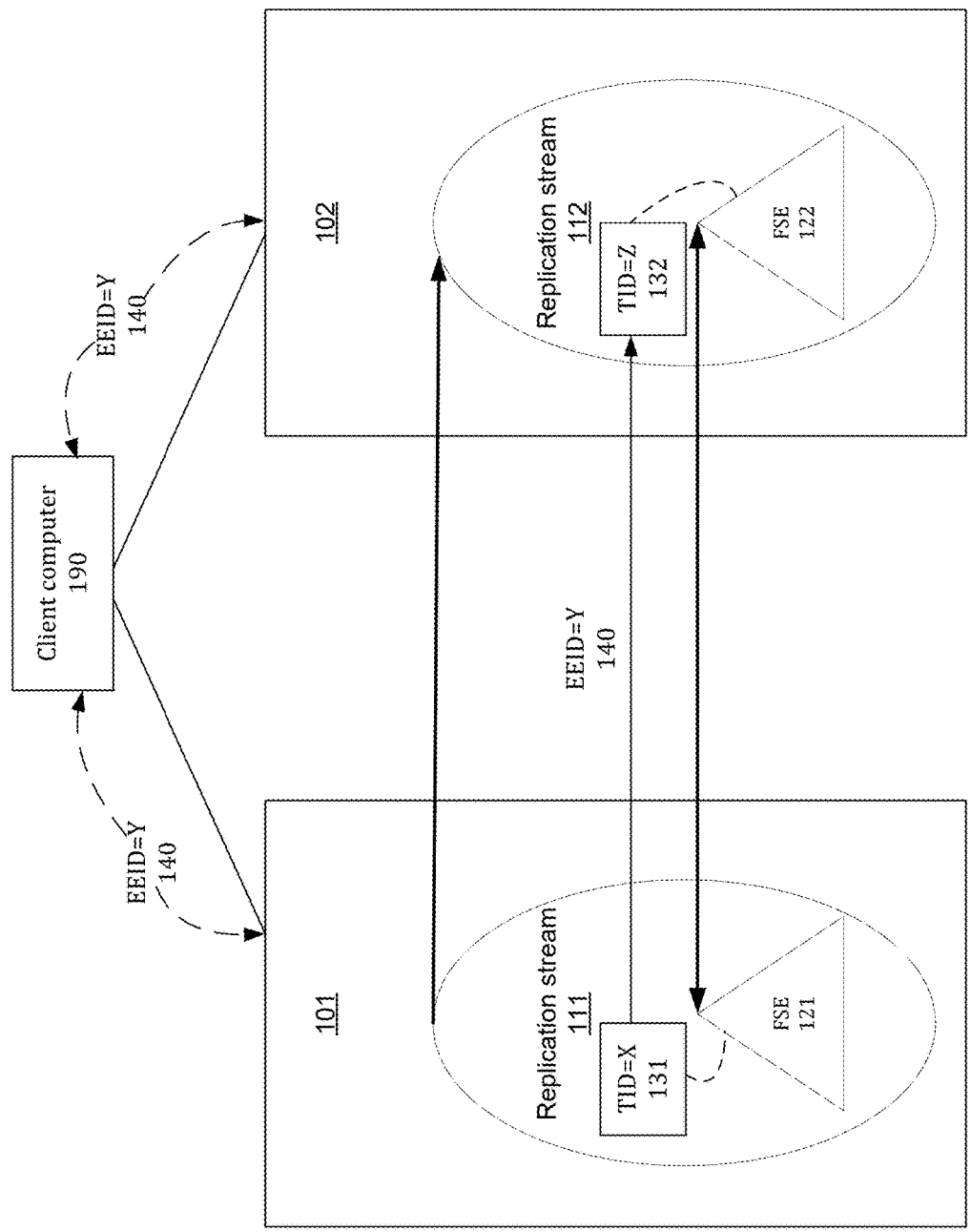
FIG. 1 is an example of storage systems.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

The present storage system and methods allow a seamless failover to a target storage system, particularly, without requiring remounting filesystem entities that were already mounted on the source storage system.

The source storage system sends, to the target storage system, the identifiers of the exposed filesystem entities (EFSEs—exposed files, exposed directories, etc.), that were mounted by the source storage system and that are associated with a certain replication stream that includes replication of the EFSEs (that reside under the filesystem sub-tree being replicated), so that the target storage system will be able to respond to client's access requests identifying the original identifiers of the EFSEs.

However, the target storage system may already use these identifiers for other EFSEs, which are not part of the replication stream, but may be part of other replication streams from other storage systems, or were originally created on the target storage system, and were assigned with identifiers independently, and therefore may cause conflicts.

Therefore, there is a need to transform the EFSE's external identifiers (EEIDs) received from the source storage system to internal EFSE identifiers within the target storage system (Target Storage System's Internal EFSE Identifiers, referred to as TID), while maintaining uniqueness of all the TIDs within the target storage system.

There is also a need to map the TIDs to and from the EEIDs. The EEIDs are used when communicating with the clients and optionally with other storage systems. When communicating with a client, the original EEID, that was assigned to the client upon mounting by the source storage system (or any other system), should always remain unchanged, particularly, after a failover. The TIDs are used internally, when there is a need to access data structures related to the EFSEs, e.g., mapping to storage locations, attributes, access permissions, etc.

Since there may be a large amount of exposed FSEs and the access to lookup a data structure that maps between external and internal identifiers (EEIDs to TIDs, and vice versa) may consume non negligible amount of time, a transform function will be applied on the EEIDs for transforming into TIDs, and a revert function will be used for reverting the TIDs back into the corresponding EEIDs.

The transform and revert function may be based on an identifier of a replication stream that includes the replicated EFSEs needed to be mapped.

The replication stream identifier is assigned by each of the source and the destination systems independently, and is assigned so as to be unique among other identifiers of replication streams handled by each system. Since the replication stream identifiers are unique in the system, and since all the EEIDs within a specific replication stream are originated at the same source system that created them in a unique manner, then—the combination of replication stream identifier and EEIDs that correspond to the replication stream—is unique.

Therefore, when receiving an EEID from the source storage system, a transform function, f1, is applied on a combination of the parameters: (i) EEID and (ii) the corresponding stream identifier (used by the destination storage system) of the replication stream that replicated the EFSE, to provide a TID, i.e.: f1(<EEID>, <stream id>). The transform function may be applied on other presentations of the parameters, for example hash values of the parameters, using a good dispersion hash function. Hash functions may be used particularly when one or both parameters (stream identifier or the original EEID) are assigned as sequential numbers, where f1 may result in conflicting values when utilizing non well dispersed values. The TID can be then used for accessing internal data structures related to the replicated EFSEs and updating content of entries in these data structures.

When receiving from a client an access request indicating a EFSE identifier (which is assumed to be an EEID), the same transform function is applied to provide the TID, which is needed for obtaining the information required for responding to the request. The TID is stored in various data structures of the system, and may be used as a key for looking up these data structures.

When there is a need to respond to a client request, or send unsolicited message regarding an EFSE to the client, or there is a need to communicate with the source storage system (or any other storage system) regarding the EFSE—a revert function is applied on a combination of the TID and the corresponding stream identifier. The revert function should provide the original value, i.e., the EEID, which is provided by e.g.: f2(<TID>, <stream id>). The revert function may be applied on other presentations of the parameters, for example hash values of the parameters.

According to an embodiment of the invention, both the transform function and the revert function may be the same reversible function that provides both the forward and the revert result. For example, applying a first XOR operation on a first value and a second value to provide a first XOR result, and then applying a second XOR operation on the first XOR result and the second value, reproduces the first value.

When applying a XOR as the transform and revert functions, the transform function is: XOR(<EEID>, <stream id>) to provide the TID, and the revert function is: XOR(<TID>, <stream id>). Alternatively, hash values of one or both of the parameters may be used.

A first storage system 101 of FIG. 1 replicates a group of filesystem entities (FSEs) that forms a portion or all of a filesystem that is stored in the first storage system, to a second storage system 102. The portion of the filesystem may be a sub-tree within the filesystem, i.e., a top directory (or the root directory—if all the filesystem is replicated) and all the files and directories descending from the top directory.

The group of FSEs that participate in a replication from the first storage system to the second storage system is referred to as a replication stream. There may be different replication streams for replicating the same group of FSEs from the first storage system to other storage systems, not shown. There may also be other replication streams for replicating other groups of FSEs from the first storage system to the second storage system. At least part of the FSEs of the group of FSEs are EFSEs that are mounted by a client, i.e., exposed to a client, and are assigned with EEIDs.

The replication stream is identified by first storage system 101 as stream 111, and identified by second storage system 102 as stream 112. The identifiers assigned to replication streams at each storage system are unique within the storage system, and the identifier of the source side for the replication stream 111 may be different from the identifier of the target side for the replication stream 112, even though it is the same replication stream. Providing different identifiers for replication streams in different storage systems may be achieved, by concatenating a unique identifier of the storage system to an index assigned to different streams. For example, identifiers for replications streams at first storage system 101, may be assigned as: 101-1, 101-2, 101-3, etc, where identifiers for replications streams at second storage system 102, may be assigned as: 102-1, 102-2, 102-3, etc.

The EFSE 121 is part of the replication stream 111. There may be other EFSEs that are replicated as part of replication stream 111, and there may be FSEs that are not exposed. The EFSE 122 is a replica of EFSE 121.

For each EFSE included in the replication stream, first storage system 101 sends an EEID associated with the EFSE. For example, EFSE 121 is identified by first storage system 101 as internal FSE identifier 131, which may have an internal value=X, that is used internally at first storage system 101. First storage system 101 translates the internal identifier 131 into an EEID 140, having a value, e.g., Y, which is a global value that is known to a user that accesses EFSE 121, and is also known to other storage systems that are involved in the replication. First storage system 101 sends EEID 140 to second storage system 102.

When second storage system 102 receives the EEID 140, it translates it into a TID 132, having an internal value=Z.

Client computer 190 (employed by a user of the storage system or executing user applications), may be connected to both first storage system 101 and second storage system 102, for redundancy purposes, and communicates with first storage system 101 as long as this system is operational, and switches to communicating with second storage system 102, when first storage system 101 fails and second storage system 102 takes over the responsibility of a primary system.

Both storage systems identify EFSE 121 or its replica 122, using the same EEID 140, which has a global value=Y. Therefore, when second storage system 102 receives access requests directed to EFSE 122, from a client computer, it applies the transform formula using the corresponding stream identifier (of replication stream 112), to obtain TID=Z, which is used as a key for looking up the data structures, using the TID as a key.

After second storage system 102 took over the role of the source storage system, it may replicate the FSEs under stream 112 to other storage systems, identifying EFSE 122 by the original EEID 140=Y.

Figure 2:
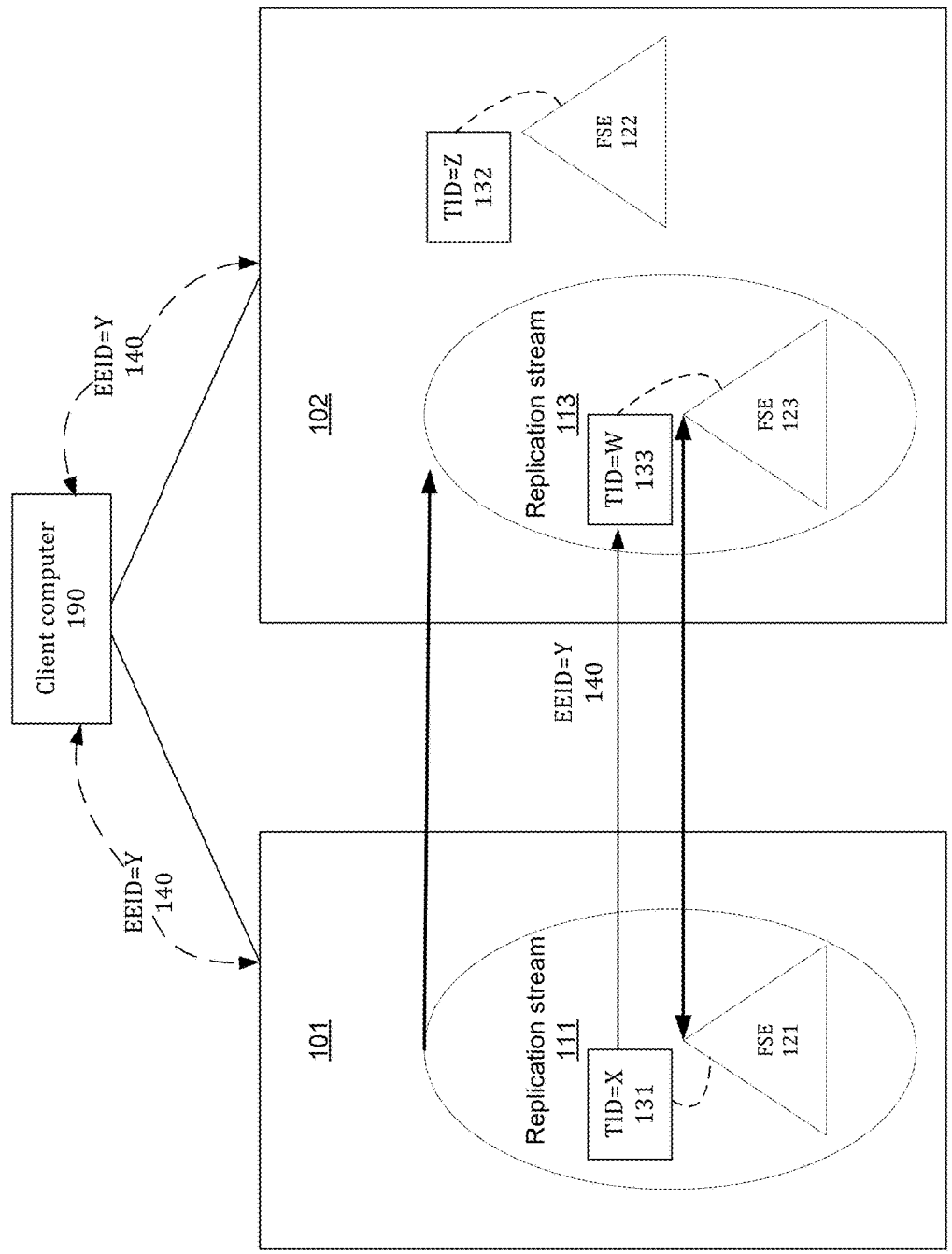
FIG. 2 is an example of storage systems.

According to FIG. 2, first storage system 101 decides to cut out the replication connection that replicates stream 111 and to reinitiate a new replication stream for the same group of FSEs or part of these FSEs. One of the purposes of disconnecting the replication stream 111, and start over a new replication stream for the same source FSEs is to preserve the current content of the replica FSE 122, or to allow FSE 122 to become an independent content that can be updated independently by users of second storage system 102, where the new replication stream creates new replicas of EFSE 121 and the other involved FSEs at second storage system 102. FSE 122 may become non-exposed FSE or may need to be remounted so as to become a EFSE again.

The new replication stream is assigned with a new unique stream identifier 113 at least at second storage system 102. From now on, the content of FSE 122 is either frozen or being updated locally, but is not part of replication updates. FSE 122 is a copy of EFSE 121 at the point in time when the replication stream 111 was disconnected and reinitiated, but when the replication proceeds, FSE 122 and EFSE 123 become different entities with different content, therefore their internal TIDs should be different from each other. EFSE 121 is replicated via the new replication stream with the same EEID 140=Y.

FSE 122 should retain its original TID=Z, since its metadata should continue to be accessible with the original TID, but it should also be different from the TID of the new replica 123 of FSE 121, since they are now distinct FSEs that occupies different entries in metadata structures. However, the TID of the new replica should be translated into the same EEID 140.

By applying a transform formula that uses the new stream identifier 113 (instead of the old stream identifier 112), the TID 133=W is now different from the old TID that keeps the value Z. TID 133 is produced by a transform function that is based on the new stream identifier 113 and the same EEID 140, which produces a different internal value for the TID. The revert function is also based on the same EEID 140=Y. For example, when using the operation "XOR", the transform function is XOR(<EEID 140>, <stream ID 113>, resulting TID 133=W, and the revert function is:

XOR(<XOR(<EEID 140>, <stream ID 113>>, <stream ID 113>, resulting back EEID 140=Y.

Figure 3:
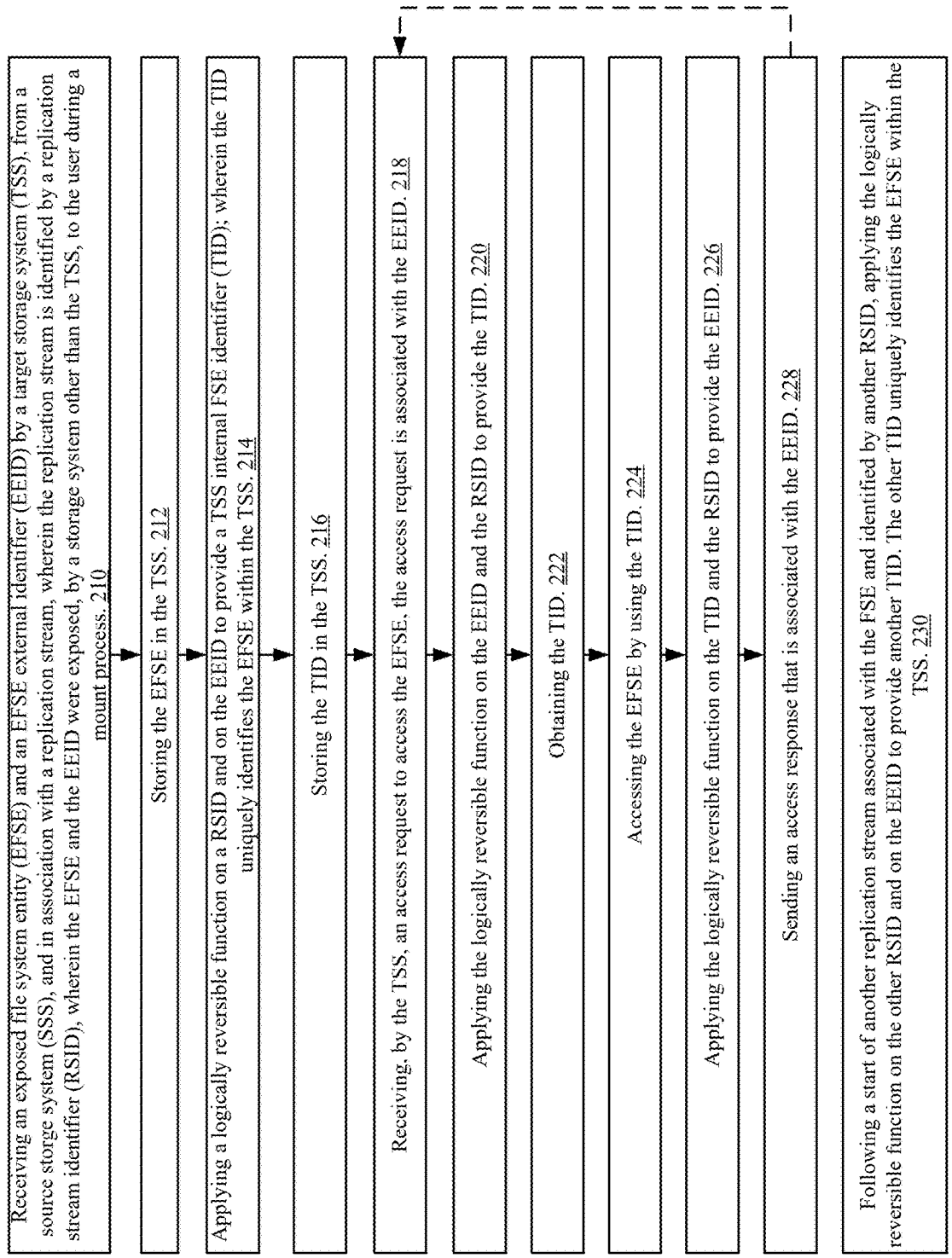
FIG. 3 is an example of a method.

FIG. 3 illustrates an example of method 200 for accessing an exposed file system entity.

According to an embodiment, method 200 starts by step 210 of receiving an exposed file system entity (EFSE) and an EFSE external identifier (EEID) by a target storage system (TSS), from a source storage system (SSS), and in association with a replication stream, wherein the replication stream is identified by a replication stream identifier (RSID), wherein the EFSE and the EEID were exposed, by a storage system other than the TSS, to the user during a mount process. The received EFSE may be the entire content of the EFSE or may be received as changes (deltas) to stored content of the EFSE, during repeated cycles of the replication. The target storage system may be the second storage system of FIGS. 1 and 2, and the source storage system may be the first storage system of FIGS. 1 and 2. The other storage system may be the source storage system, or may another storage system that differ from the source storage system, but was operating as a source storage system in the past that replicated the EFSE and EEID to the current source storage system. The EFSE may be one of multiple FSEs (non-exposed) and EFSEs that are being replicated as part of the replication stream.

According to an embodiment, step 210 is followed by step 212 of storing the EFSE without storing the EEID in the TSS.

According to an embodiment, step 212 is followed by step 214 of applying a logically reversible function on a RSID and on the EEID to provide a TSS internal FSE identifier (TID); wherein the TID uniquely identifies the EFSE within the TSS. The TID uniquely identifies the EFSE in the sense that the value of the TID is unique, and no other TID of another EFSE has the same value as the TID.

A logical reversible function is a function in which (a) the output of the function can be computed when applying the logical reversible function on an input of the function, and (b) the input of the function can be computed when applying the logical reversible function on the output of the function.

According to an embodiment, step 214 is followed by step 216 of storing the TID in the TSS. The TID is used as a key for accessing various FSE metadata structures that stores metadata regarding the EFSE and other EFSEs stored in the TSS. The FSE metadata structures are looked up by using the TID for obtaining information required for accessing the EFSEs, e.g., authentication, address mapping, locking etc.

According to an embodiment, the logically reversible function is a logic XOR function. Alternatively—the logically reversible function is not a logic XOR function.

According to an embodiment, step 216 is followed by step 218 of receiving, by the TSS, an access request to access the EFSE, the access request is associated with the EEID.

According to an embodiment, step 218 is followed by step 220 of applying the logically reversible function on the EEID and the RSID to provide the TID.

According to an embodiment, step 220 is followed by step 222 of obtaining the TID.

According to an embodiment, step 222 is followed by step 224 of accessing the EFSE by using the TID. For example, the TID is used for obtaining and/or updating the mapping of the EFSE into physical locations in the storage devices, authenticating the user that sent the access request, checking and acquiring locks, etc.

According to an embodiment, step 224 is followed by step 226 of applying the logically reversible function on the TID and the RSID to provide the EEID.

According to an embodiment, step 226 is followed by step 228 of sending to the user a message related to the EFSE, wherein the message is associated with the EEID. The message may include the EEID. The message may be an access response to an access request sent by the user, or may be an unsolicited message, for example, sending notifications regarding the EFSE, such as notifications related to locks, changes made by others, etc.

According to an embodiment, steps 210-214 may be followed by many repetitions of steps 216-228.

According to an embodiment, steps 210-214 lay the foundation for responding to many access requests (executing steps 216-228).

It should be noted that from time to time the foundation should be amended—for example when the replication stream associated with the EFSE changes.

According to an embodiment, method 200 includes step 230.

According to an embodiment, step 230 is executed following a start of another replication stream associated with the FSE and identified by another RSID.

According to an embodiment, step 230 includes applying the logically reversible function on the other RSID and on the EEID to provide another TID. The other TID uniquely identifies the EFSE within the TSS. According to an embodiment, step 230 is followed by step 232 of storing the other TID in the TSS.

Figure 4:
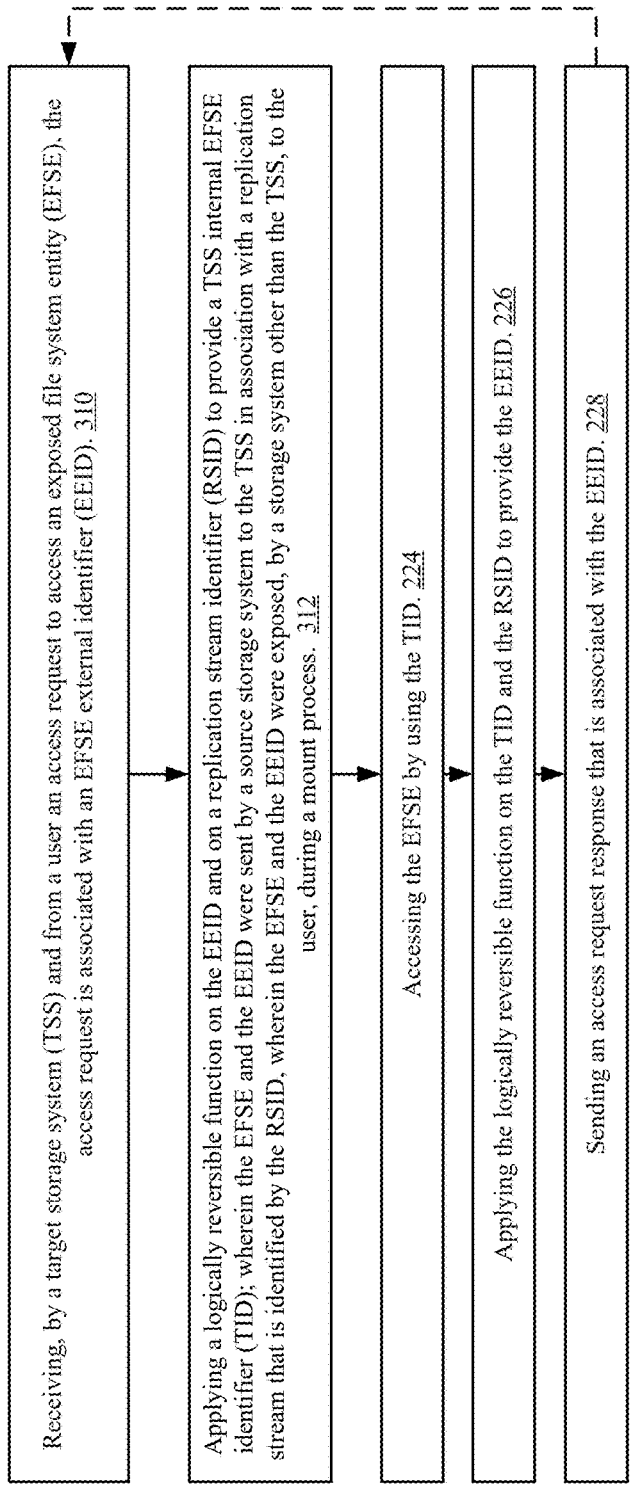
FIG. 4 is an example of a method.

FIG. 4 illustrates an example of method 300 for responding to an access request from a user.

According to an embodiment, method 300 starts by step 310 of receiving, by a target storage system (TSS) and from a user, an access request to access an exposed file system entity (EFSE), the access request is associated with an EFSE external identifier (EEID).

According to an embodiment, step 310 is followed by step 312 of applying a logically reversible function on the EEID and on a replication stream identifier (RSID) to provide a TSS internal EFSE identifier (TID), wherein the EFSE was sent to the TSS, from a source storage system, in association with a replication stream that is identified by the RSID.

According to an embodiment, step 312 is followed by step 224 of accessing the EFSE by using the TID.

According to an embodiment, step 224 is followed by step 226 of applying the logically reversible function on the TID and the RSID to provide the EEID.

According to an embodiment, step 226 is followed by step 228 of sending an access response that is associated with the EEID.

According to an embodiment, the logically reversible function is a logic XOR function. Alternatively—the logically reversible function is not a logic XOR function.

Figure 5:
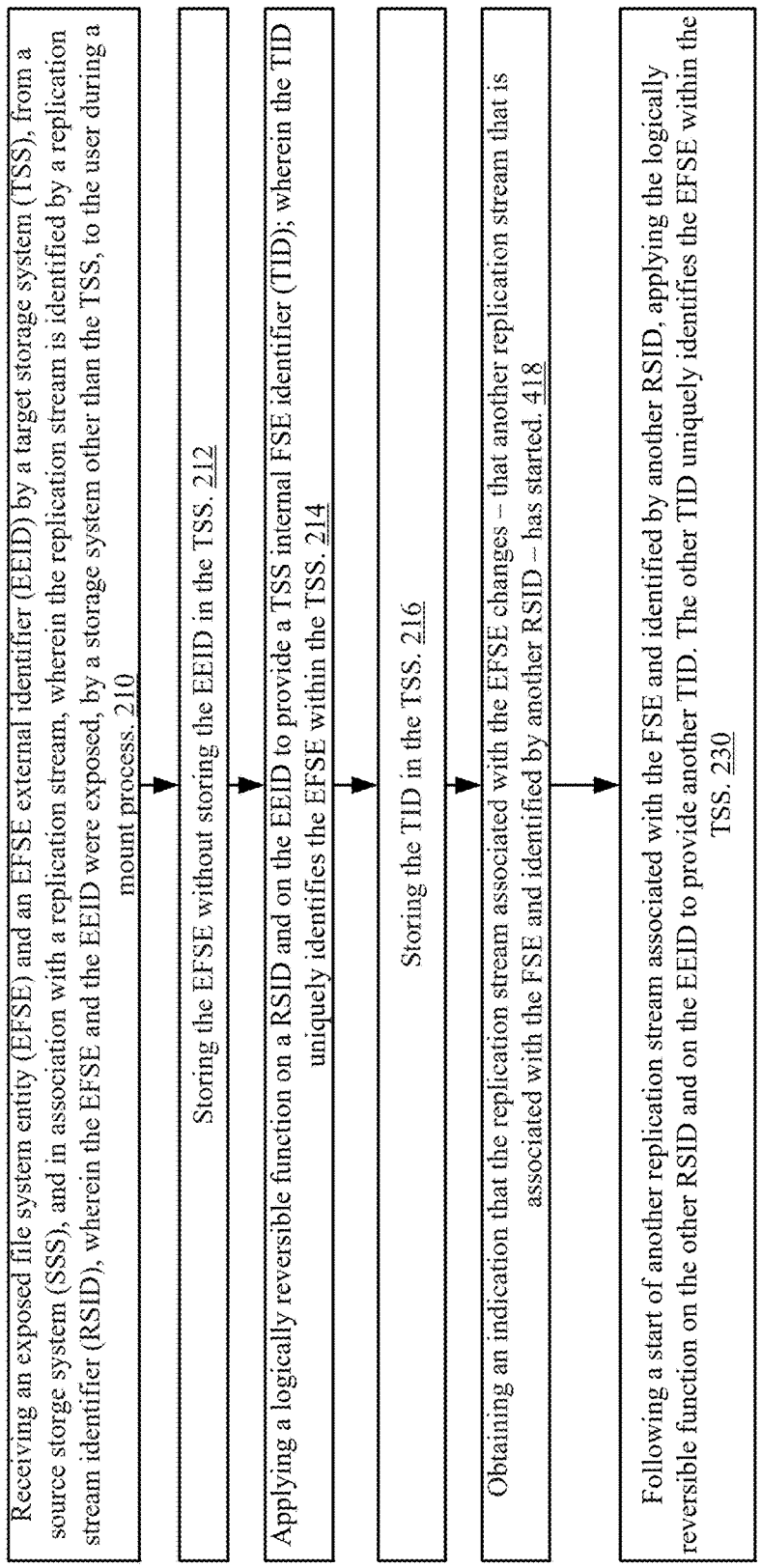
FIG. 5 is an example of a method.

FIG. 5 illustrates an example of method 400 for managing exposed FSEs.

According to an embodiment, method 400 starts by step 210 of receiving an exposed file system entity (EFSE) and an EFSE external identifier (EEID) by a target storage system (TSS), from a source storage system (SSS), and in association with a replication stream, wherein the replication stream is identified by a replication stream identifier (RSID), wherein the EFSE and the EEID were exposed, by a storage system other than the TSS, to the user during a mount process.

According to an embodiment, step 210 is followed by step 212 of storing the EFSE in the TSS.

According to an embodiment, step 212 is followed by step 214 of applying a logically reversible function on a RSID and on the EEID to provide a TSS internal FSE identifier (TID); wherein the TID uniquely identifies the EFSE within the TSS.

According to an embodiment, step 214 is followed by step 216 of storing the TID in the TSS. The TID may serve as a key for looking up metadata related to the EFSE.

According to an embodiment, step 216 is followed by step 418 of obtaining an indication that the replication stream associated with the EFSE changes—that another replication stream that is associated with the FSE and identified by another RSID—has started. The other replication stream may replicate a different content of the EFSE, where this content is stored, by the TSS, separately from the original replicated content of the FSE (in a different storage location).

According to an embodiment, step 418 is followed by step 230 of applying the logically reversible function on the other RSID and on the EEID to provide another TID. The other TID uniquely identifies the EFSE within the TSS.

According to an embodiment, step 230 is followed by step 232 of storing the other TID in the TSS. The other TID may serve as another key for looking up another content of metadata related to the stored content of the EFSE, e.g., another address mapping. For example, the original TID may serve as a key for searching the address mapping of the content of the EFSE that was replicated as part of the original replication stream, and the other TID may serve as a key for searching address mapping of the different content of the EFSE that was replicated as part of the other replication stream, i.e., there is a different address mapping for the original TID and the other TID.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for responding to an access request from a user, the method comprising:
    receiving, by a target storage system (TSS) and from a user, an access request to access an exposed file system entity (EFSE), the access request is associated with an EFSE external identifier (EEID);
    applying a logically reversible function on the EEID and on a replication stream identifier (RSID) to provide a TSS internal EFSE identifier (TID); wherein the EFSE and the EEID were sent by a source storage system to the TSS in association with a replication stream that is identified by the RSID, wherein the EFSE and the EEID were exposed, by a storage system other than the TSS, to the user, during a mount process;
    accessing the EFSE using the TID; and
    wherein the TID uniquely identifies the EFSE within the TSS.

2. The method according to claim 1, wherein the logically reversible function is a logic XOR function.

3. The method according to claim 1, wherein the logically reversible function differs from a logic XOR function.

4. The method according to claim 1, comprising:
    applying the logically reversible function on the TID and the RSID to provide the EEID; and
    sending an access response that is associated with the EEID.

5. The method according to claim 1 comprising following a start of another replication stream associated with the EFSE and identified by another RSID, applying the logically reversible function on the other RSID and on the EEID to provide another TID; wherein the other TID uniquely identifies the EFSE within the TSS; and
    storing the other TID in the TSS.

6. A non-transitory computer readable medium for responding to an access request from a user, the non-transitory computer readable medium that stores instructions for:
    receiving, by a target storage system (TSS) and from a user, an access request to access an exposed file system entity (EFSE), the access request is associated with an EFSE external identifier (EEID);
    applying a logically reversible function on the EEID and on a replication stream identifier (RSID) to provide a TSS internal EFSE identifier (TID); wherein the EFSE and the EEID were sent by a source storage system to the TSS in association with a replication stream that is identified by the RSID, wherein the EFSE and the EEID were exposed, by a storage system other than the TSS, to the user, during a mount process;
    accessing the EFSE using the TID; and
    wherein the TID uniquely identifies the EFSE within the TSS.

7. The non-transitory computer readable medium according to claim 6, wherein the logically reversible function is a logic XOR function.

8. The non-transitory computer readable medium according to claim 6, wherein the logically reversible function differs from a logic XOR function.

9. The non-transitory computer readable medium according to claim 6, that stores instructions for:
    applying the logically reversible function on the TID and the RSID to provide the EEID; and
    sending an access request response that is associated with the EEID.

10. The non-transitory computer readable medium according to claim 6, that stores instructions for following a start of another replication stream associated with the EFSE and identified by another RSID, applying the logically reversible function on the other RSID and on the EEID to provide another TID; wherein the other TID uniquely identifies the EFSE within the TSS; and storing the other TID in the TSS.

11. A method for accessing an exposed file system entity, the method comprising:
receiving an exposed file system entity (EFSE) and an EFSE external identifier (EEID) by a target storage system (TSS), from a source storage system (SSS), and in association with a replication stream, wherein the replication stream is identified by a replication stream identifier (RSID), wherein the EFSE and the EEID were exposed, by a storage system other than the TSS, to the user, during a mount process;
storing the EFSE in the TSS;
applying a logically reversible function on the RSID and on the EEID to provide a TSS internal FSE identifier (TID); wherein the TID uniquely identifies the EFSE within the TSS;
storing the TID in the TSS;
receiving, by the TSS, an access request to access the EFSE, the access request is associated with the EEID;
applying the logically reversible function on the EEID and the RSID to provide the TID;
obtaining the TID; and
accessing the EFSE by using the TID.

12. The method according to claim 11, wherein the logically reversible function is a logic XOR function.

13. The method according to claim 11, wherein the logically reversible function differs from a logic XOR function.

14. The method according to claim 11, comprising:
applying the logically reversible function on the TID and the RSID to provide the EEID; and
sending an access response that is associated with the EEID.

15. The method according to claim 11 comprising following a start of another replication stream associated with the EFSE and identified by another RSID, applying the logically reversible function on the other RSID and on the EEID to provide another TID; wherein the other TID uniquely identifies the EFSE within the TSS; and storing the other TID in the TSS.

* * * * *